(12) United States Patent
Durvaux et al.

(10) Patent No.: US 6,449,243 B1
(45) Date of Patent: Sep. 10, 2002

(54) METHOD OF TRANSMITTING DATA IN A COMMUNICATIONS NETWORK AND COMMUNICATIONS NETWORK

(75) Inventors: Marc Durvaux, Montigny-le-Tilleul; Thierry Jesupret, Brussels, both of (BE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/227,883

(22) Filed: Jan. 11, 1999

(30) Foreign Application Priority Data

Jan. 12, 1998 (EP) .............................. 98440002

(51) Int. Cl.⁷ ................................. H04J 9/00
(52) U.S. Cl. ................ 370/204; 370/282; 725/124; 725/114
(58) Field of Search ............... 725/87–81, 105, 725/107, 114, 117–8, 120, 121, 124–7, 131; 370/252, 465, 431, 437, 438, 457, 463, 282, 276, 204–206

(56) References Cited

U.S. PATENT DOCUMENTS

| | | | |
|---|---|---|---|
| 5,577,087 A | | 11/1996 | Furuya |
| 5,765,097 A | * | 6/1998 | Dail ............................ 725/125 |
| 5,930,231 A | * | 7/1999 | Miller et al. ................. 370/210 |
| 6,032,019 A | * | 2/2000 | Chen et al. .................. 348/193 |
| 6,049,693 A | * | 4/2000 | Baran et al. ................. 725/124 |
| 6,160,990 A | * | 12/2000 | Kobayashi et al. ......... 725/125 |

FOREIGN PATENT DOCUMENTS

WO    WO 97/15131    4/1997

OTHER PUBLICATIONS

H. Hessenmueller et al, "Zugangsnetzstrukturen fur Interaktive Videoientste (Teil 1)", Fernmele–Ingenier, vol. 48, No. 8, Aug. 1994, pp. 1–32, XP000647017.

* cited by examiner

*Primary Examiner*—David Vincent
(74) *Attorney, Agent, or Firm*—Sughrue Mion, PLLC

(57) ABSTRACT

A method of transmitting data in a communications network and a communications network for carrying out the method are disclosed, the communications network having a plurality of network terminations 1 which are connected to a head end 2 via data channels 3 and have at least one return channel 4 to the head end 2. The data rate in the return channel 4 is adapted to the transmission quality of the return channel 4 by setting appropriate modulation methods in the network terminations.

14 Claims, 1 Drawing Sheet

METHOD OF TRANSMITTING DATA IN A COMMUNICATIONS NETWORK AND COMMUNICATIONS NETWORK

BACKGROUND OF THE INVENTION

This invention relates to a method of transmitting data in a communications network and to a communications network as set forth in the preambles of the independent claims.

Service-on-demand provides for the bidirectional exchange of information between customers and the server network, so that a control channel is needed from the network to the customer and a return channel from the customer to the network. The return channel, generally in combination with a control channel, has several main functions, such as identification of the customer to the network, connection setup and release, interaction with the server, and feeding in of own data to establish a videotelephone call, for example.

An essential feature of the return channel is the bit rate available to the customer.

From an article entitled "Zugangsnetzstrukturen für interaktive Videodienste (Teil 1)", published in "Der Fernmeldeingenieur", No. 8, 1994, it is known that different transmission techniques are used for the return channel. Frequency-division multiplexing, time-division multiplexing or code-division multiplexing techniques are used to transmit data from the different network terminations in the return channel to the head end. Central or decentralized control is provided for the different transmission techniques to avoid collisions between the data of different network terminations. Via a control channel, the data terminal is granted permission to transmit or the transmission is interrupted. The assignment of time slots in time-division multiplexing, for example, can be dynamically adapted to the customer's requirements. For this, however, return channels with fixed data rates are used. For the transmission of high data rates, the return channels are generally bandlimited and constitute bottlenecks. In addition, the return channel is affected by noise. To solve these problems, the number of bits per symbol of the carrier must be increased, which, however, increases the sensitivity to noise phenomena. To suppress the noise, the number of bits per symbol would have to be reduced.

One approach to solve these problems is to use OFDM (orthogonal frequency division multiplexing) with n-QAM (n-state quadrature amplitude modulation). In this technique, the information to be transmitted is modulated onto a frequency comb, with each frequency of the comb being modulated with a relatively large number of bits per symbol. Using suitable error-correcting mechanisms, transmission errors and noise-induced interference can thus be minimized. The solution using OFDM requires a relatively complex modulator in the terminal, which adds to the cost of the terminal.

SUMMARY OF THE INVENTION

The method according to the invention has the advantage that the data rate in the return channel can be adapted to the transmission quality of the return channel by setting suitable modulation methods in the network terminations. This makes it possible in a simple manner to establish an adaptive system in which The data rate can be made dependent on the quality of the return channel. For a very poor connection, this means that transmission takes place at a low data rate in order to avoid large transmission errors. The data rate is determined by the type of modulation of the carrier in the return channel. For a poor return channel, a robust modulation method, such as QPSK (quadrature phase-shift keying), will be chosen, while in case of good transmission quality, 16 QAM, for example, can be used.

By the measures recited in the subclaims, the method set forth in the independent claim can be improved.

Particularly advantageously, the transmission qualities of the return channels are determined centrally at the head end, which calculates therefrom a criterion on the basis of which a control signal sets the modulation methods in the network terminations.

Advantageously, modulation schemes are used which produce different numbers of bits per symbol, thus rendering the transmission channel robust or less robust.

Advantageously, to evaluate the quality of the channel, the signal-to-noise ratio of the signal is evaluated.

According to another advantageous aspect of the invention, the method can be used both in a wirelines network and in a radio network.

BRIEF DESCRIPTION OF THE DRAWING

An embodiment of the invention is illustrated in the accompanying drawing and will now be explained in more detail.

DETAILED DESCRIPTION OF THE INVENTION

Figure 1:
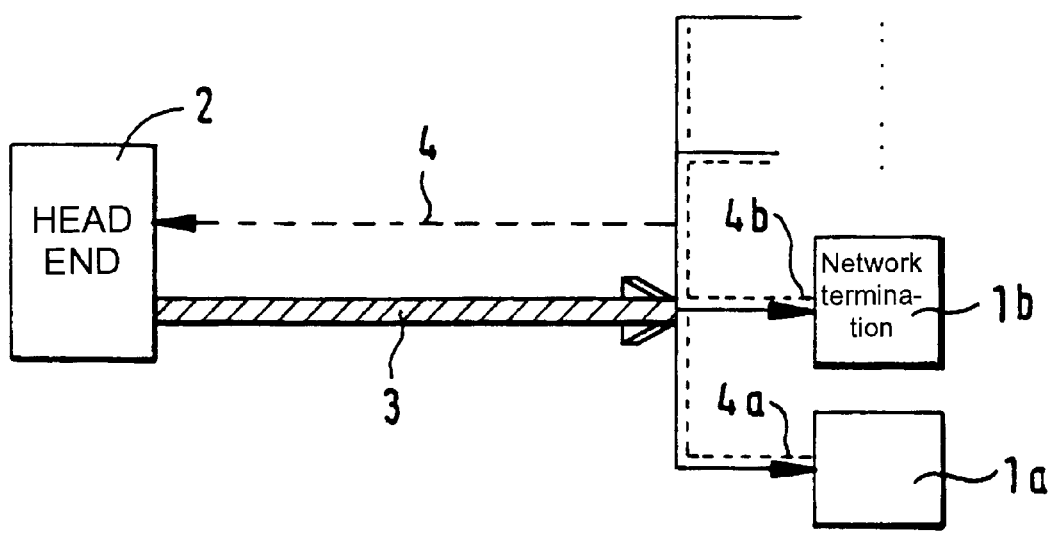
FIG. 1 shows schematically the structure of the communications network.

In FIG. 1, a head end 2 is connected to a plurality of network terminations 1a, 1b, ... via a data channel 3. The various network terminations 1a, 1b, ... are connected to the head end via a return channel 4. Different return channels can be addressed by the different network terminations, which is indicated by the dashed connections 4a, 4b, ...

Figure 2:
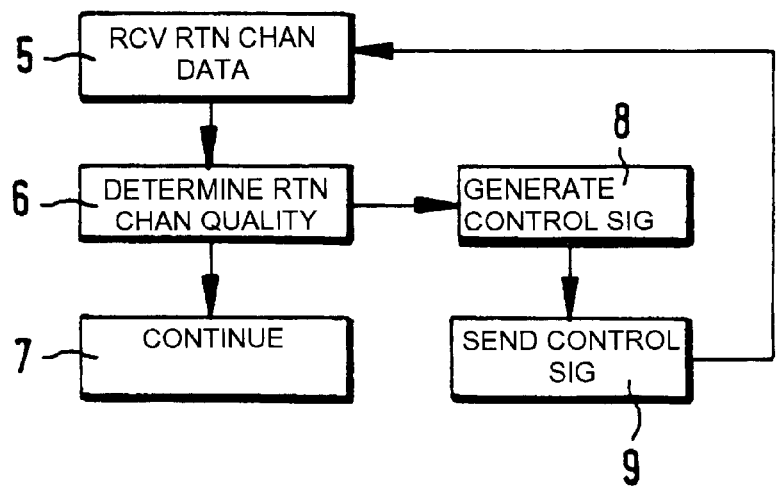
FIG. 2 shows the sequence of steps of the method according to the invention.

FIG. 2 shows a flowchart of the method according to the invention. In step 5, the head end 2 receives data of the return channel 4. At the head end, the quality of the return channel is determined in a measuring step 6. If the quality is good or sufficient, the head end will continue to receive the return channel, 7, without outputting further control signals. If the quality of the return channel is poor, a control signal will be generated in step 8 which is transmitted to the attached network termination in step 9. The network termination 1 receives the control signal and changes its modulation method in response to this signal. The data transmitted on the return channel are again received at the head end 2 in step 5, checked for quality, and, if good, further processed. The method is analogous if the return channel is very good, which is determined in step 6. If the quality of the return channel is very good, in step 8, the head end generates a control signal which results in an increase in the data rate. For example, changeover to 16-QAM is effected, whose spectrum efficiency is twice that of QPSK. The return channel quality measurement at the head end is made by determining the signal-to-noise ratio. The signal of each channel is examined using preset thresholds, and based on the result of the examination, a criterion is created which assigns to the return channel a "good", "poor", "mediocre", etc. Based on the criteria, a management center at the head end decides which frequency and which modulation scheme a specific network termination should use.

The system adapts itself automatically to different signal-to-noise ratios on the return channel. This adaptation of the digital modulation has the advantage that a simple and low-cost solution can be installed in each network termination. The system responds flexibly to the different conditions of the transmission path and allows the user to transmit high data rates with good quality.

What is claimed is:

1. A method of transmitting data in a communications network having a plurality of network terminations which are connected to a head end via data channels and have at least one return channel to the head end, characterized in that the data rate in the return channel is adapted to the transmission quality of the return channel, as determined at the head end, by setting appropriate modulation methods in the network terminations, the modulation methods having different numbers of bits per symbol.

2. A method of transmitting data in a communications network as claimed in claim 1, characterized in that the respective transmission qualities of the return channels connected to the head end are evaluated, and that the evaluation provides a criterion according to which a control signal is sent to the network terminations for adapting the modulation method in the network terminations.

3. A method of transmitting data in a communications network as claimed in claim 1, characterized in that modulation methods include n-QAM and QPSK.

4. A method of transmitting data in a communications network as claimed in claim 1, characterized in that the evaluation is based on the signal-to-noise ratio of the signal on the return channel.

5. A method of transmitting data in a communications network as claimed in claim 1, characterized in that the type of modulation and/or the return channel are switched.

6. A communications network for carrying out the method of claimed in claim 1, characterized in that the return channel is a wireline channel or a radio channel.

7. A communications network as claimed in claim 6, characterized in that the network terminations comprise means for switching their respective modulation units or means for switching between different modulation units.

8. A method of transmitting data in a communications network having a plurality of network terminations which are connected to a head end via data channels and have at least one return channel to the head end, comprising:

at only the head end, making an evaluation of the transmission quality of the return channel;

selecting a modulation method, from a plurality of modulation methods with different numbers of bits per symbol, based on said evaluation of transmission quality; and sending a control signal to one of the network terminations indicating the selected modulation method.

9. A method of transmitting data in a communications network as claimed in claim 8, further comprising transmitting data in the return channel in accordance with the control signal indicating the selected modulation method.

10. A method of transmitting data in a communications network as claimed in claim 8, wherein the plurality of modulation methods includes n-QAM and QPSK.

11. A method of transmitting data in a communications network as claimed in claim 8, characterized in that the evaluation is based on the signal-to-noise ratio of the signal on the return channel.

12. A method of transmitting data in a communications network as claimed in claim 8, wherein the sending of the control signal also indicates a switch of return channel.

13. A method of transmitting data in a communications network as claimed in claim 8, wherein the return channel is a wireline channel.

14. A method of transmitting data in a communications network as claimed in claim 8, wherein the return channel is a radio channel.

* * * * *